US011006028B2

United States Patent
Ikei et al.

(10) Patent No.: US 11,006,028 B2
(45) Date of Patent: May 11, 2021

(54) IMAGE CAPTURING DEVICE

(71) Applicants: Yasushi Ikei, Hino (JP); Kento Tashiro, Hino (JP)

(72) Inventors: Yasushi Ikei, Hino (JP); Kento Tashiro, Hino (JP)

(73) Assignees: Yasushi Ikei, Tokyo (JP); Kento Tashiro, Tokyo (JP)

( * ) Notice: Subject to any disclaimer, the term of this patent is extended or adjusted under 35 U.S.C. 154(b) by 0 days.

(21) Appl. No.: 16/473,326

(22) PCT Filed: Feb. 13, 2017

(86) PCT No.: PCT/JP2017/005161
§ 371 (c)(1),
(2) Date: Jun. 25, 2019

(87) PCT Pub. No.: WO2018/123074
PCT Pub. Date: Jul. 5, 2018

(65) Prior Publication Data
US 2020/0128160 A1 Apr. 23, 2020

(30) Foreign Application Priority Data

Dec. 27, 2016 (JP) .................. 2016-253291

(51) Int. Cl.
*H04N 5/225* (2006.01)
*G06K 9/32* (2006.01)
(Continued)

(52) U.S. Cl.
CPC ......... *H04N 5/2257* (2013.01); *G06K 9/3208* (2013.01); *G08B 13/1963* (2013.01);
(Continued)

(58) Field of Classification Search
CPC ............. H04N 5/2257; H04N 5/23299; H04N 13/204; H04N 13/366; H04N 5/23238;
(Continued)

(56) References Cited

U.S. PATENT DOCUMENTS 5,721,585 A * 2/1998 Keast ................. G02B 13/06
348/36
6,734,914 B1 * 5/2004 Nishimura ........... H04N 13/239
348/375
(Continued)

FOREIGN PATENT DOCUMENTS

JP 2004-205439 A 7/2004
JP 2005-92121 A 4/2005
(Continued)

OTHER PUBLICATIONS

Yanagida, Yasuyuki etal., "Dynamic Effects of Inconsistent Field of View in HMD-based Telexistence Systems", Transactions of the Virtual Reality Society of Japan, 2002, vol. 7, No. 1, pp. 69-78, with English Abstract; Cited in the Specification. (10 pages).
(Continued)

*Primary Examiner* — Albert H Cutler
(74) *Attorney, Agent, or Firm* — Westerman, Hattori, Daniels & Adrian, LLP

(57) ABSTRACT

[Problem] To provide a photographing apparatus that reduces motion blur caused by camera rotation, provides high quality binocular parallax video, and suppresses visually induced motion sickness. [Solution] A photographing apparatus 1 is provided with a plurality of photographing units 10 that can form an entire peripheral image, and further provided with: a photographing unit installation unit 20 in which the photographing units 10 are installed; a rotary driving shaft 30 that rotatably supports the photographing unit installation unit 20; a driving unit (motor) 40 that applies rotational force to the rotary driving shaft 30; a
(Continued)

photographing unit shaft 50 that is provided to the photographing unit installation unit 20 so as to rotatably fix the photographing units 10 at prescribed respective positions; and driving force transmission means 60 that are provided to both the rotary driving shaft 30 and the photographing unit shaft 50 so as to transmit the rotary driving force of the rotary driving shaft 30, wherein the photographing units 10 can hold a state of facing the prescribed positions without following the rotation of the photographing unit installation unit 20 when the photographing unit installation unit 20 rotates.

4 Claims, 7 Drawing Sheets

(51) Int. Cl.
| | |
|---|---|
| *G08B 13/196* | (2006.01) |
| *H04N 5/232* | (2006.01) |
| *H04N 13/204* | (2018.01) |
| *H04N 13/366* | (2018.01) |
| *G06F 3/01* | (2006.01) |
| *H04N 13/239* | (2018.01) |
| *G03B 37/04* | (2021.01) |
| *G03B 37/06* | (2021.01) |
| *G03B 17/56* | (2021.01) |
| *G03B 35/08* | (2021.01) |

(52) U.S. Cl.
CPC ..... *H04N 5/23238* (2013.01); *H04N 5/23245* (2013.01); *H04N 5/23299* (2018.08); *H04N 13/204* (2018.05); *H04N 13/366* (2018.05)

(58) Field of Classification Search
CPC .. H04N 5/23245; H04N 5/2258; H04N 13/00; H04N 13/20; H04N 13/239; H04N 13/332; H04N 13/368; H04N 13/378; H04N 13/383; G06K 9/3208; G08B 13/1963; G03B 37/04; G03B 37/06; G03B 17/561; G03B 35/08; G02B 27/02; G02B 30/00
See application file for complete search history.

(56) References Cited

U.S. PATENT DOCUMENTS

| | | | |
|---|---|---|---|
| 10,577,125 B1* | 3/2020 | Burtt | B64C 39/024 |
| 2005/0104999 A1 | 5/2005 | Wada et al. | |
| 2006/0072020 A1* | 4/2006 | McCutchen | H04N 5/23238 348/218.1 |
| 2011/0128348 A1* | 6/2011 | Theobald | H04N 7/181 348/36 |
| 2012/0147146 A1* | 6/2012 | Namgoong | H04N 13/239 348/47 |
| 2012/0155786 A1* | 6/2012 | Zargarpour | H04N 5/23238 382/284 |
| 2015/0002623 A1 | 1/2015 | Masugi et al. | |
| 2015/0341557 A1* | 11/2015 | Chapdelaine-Couture | G06T 3/0006 348/38 |

FOREIGN PATENT DOCUMENTS

| | | |
|---|---|---|
| JP | 2013-11801 A | 1/2013 |
| JP | 2015-12445 A | 1/2015 |

OTHER PUBLICATIONS

Yanagida, Yasuyuki., "Recent Progress in Telexistence Visual Systems", Academic Journal of the Institute of Systems-Control and Information Engineers, Dec. 15, 2002, vol. 46, No. 12, pp. 745-750, with English Abstract; Cited in the Specification. (7 pages).

* cited by examiner

IMAGE CAPTURING DEVICE

TECHNICAL FIELD

The present invention relates to an image capturing device which allows motion blur attributable to camera rotation and VR sickness to be reduced and can provide high quality binocular parallax videos.

BACKGROUND ART

As inexpensive omnidirectional cameras have become commercially available, 360° videos (full-sphere videos) are in common use.

With the spread of head mounted displays (HMDs), there has been an increasing demand for full-sphere videos viewable in association with head movement. Various telepresence systems using HMDs have been developed (see for example NPL 1). Various telexistence systems have also been proposed (NPL 2).

CITATION LIST

Non Patent Literature

[NPL 1] Dynamic Effects of Inconsistent Field of View in HMD-based Telexistence System, Yasuyuki YANAGIDA, et.al, Transactions of the Virtual Reality Society of Japan, vol. 7, No. 1, 2002

[NPL 2] Recent Progress in Telexistence Visual Systems, Yasuyuki YANAGIDA, System/Control/Information: Academic Journal of The Institute of Systems, Control and Information Engineers, 46(12), pp. 745-750, Dec. 15, 2002

SUMMARY OF INVENTION

Technical Problem

Binocular stereopsis is enabled by the conventionally proposed omnidirectional camera and the HMD, while when two cameras are used in image capturing, the cameras must be directed along the line-of-sight direction (the direction the head faces) of the HMD wearer. This can be achieved by a VR camera for viewing a VR space, but using an actual camera for telepresence of a real space, delay by the driving system for rotating the cameras and delay in communication deteriorate the video quality and causes VR sickness, which hinders operation even in short period of time and makes operation in a long period of time extremely hard.

Therefore, it is an object of the present invention to provide an image capturing device which allows motion blur attributable to camera rotation and VR sickness to be reduced and can provide high quality binocular parallax videos.

Solution to Problem

The inventors have made efforts in solving the problem and have found that the object can be achieved by correcting the direction of a camera when the position of the camera moves and made the present invention.

More specifically, according to the present invention, the following device is provided. 1. An image capturing device including a plurality of image capturing units each capable of forming an omnidirectional image, the image capturing device including an image capturing unit mounting portion on which the image capturing units are mounted, a rotation driving shaft which rotatably supports the image capturing unit mounting portion, a driving unit which supplies rotating force to the rotation driving shaft, and a plurality of image capturing unit shafts disposed to the image capturing unit mounting portion such that the image capturing unit shafts rotatably support each of the image capturing units in a predetermined position, the image capturing device further including a rotation adjusting mechanism which adjusts the respective rotations of the rotation driving shaft and the image capturing unit shafts so that the image capturing unit shafts does not co-rotate with the rotation driving shaft, the image capturing unit being kept facing a predetermined direction without following the rotation of the image capturing unit mounting portion when the image capturing unit mounting portion is rotated.

2. The image capturing device of 1, wherein the rotation adjusting mechanism is a driving force transmitting means disposed to the rotation driving shaft and the image capturing unit shafts so that the rotation driving force from the driving unit is transmitted to each of the image capturing unit shafts through the rotation driving shaft.

3. The image capturing device of 2, wherein the image capturing device includes two image capturing units placed at a predetermined distance apart from each other and placed to face viewpoints set for each of the image capturing units, and the driving force transmitting means includes a center gear disposed on the rotation driving shaft and a plurality of fulcrum gears disposed on the image capturing unit shafts and configured to engage with the center gear.

4. A video display system which displays a video in response to any observer's request to display a video, the system including the image capturing device of claim 1 for obtaining a video, a line-of-sight direction recognizing unit which obtains a change in a line-of-sight direction of the observer, a rotation instructing unit which instructs the image capturing device to rotate in a given direction in response to the change in the line-of-sight direction obtained by the line-of-sight direction recognizing unit, and a video display unit which displays a video obtained by the image capturing device.

Advantageous Effects of Invention

The image capturing device according to the present invention allows motion blur and VR sickness to be reduced and can provide high quality binocular parallax videos.

REFERENCE SIGNS LIST

Figure 1:
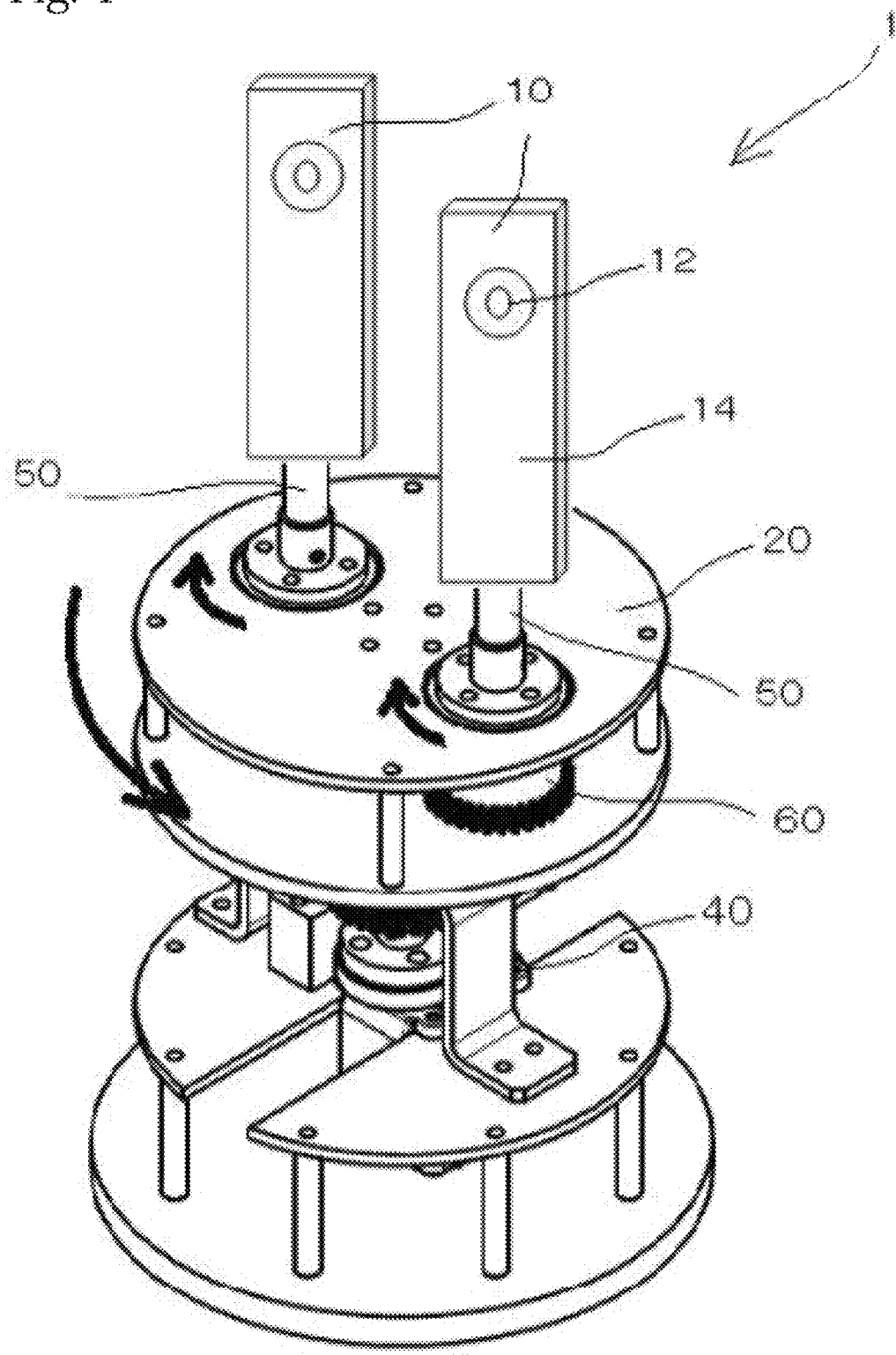
FIG. 1 is a perspective view of an image capturing device according to one embodiment of the present invention.

1 Image capturing device
10 Image capturing unit
20 Image capturing unit mounting portion
30 Rotation driving shaft
40 Driving unit
50 Image capturing unit shaft
60 Driving force transmitting means

DESCRIPTION OF EMBODIMENTS

Hereinafter, the present invention will be described in detail in conjunction with the accompanying drawings while the following description is not intended to limit the present invention.

Figure 2:
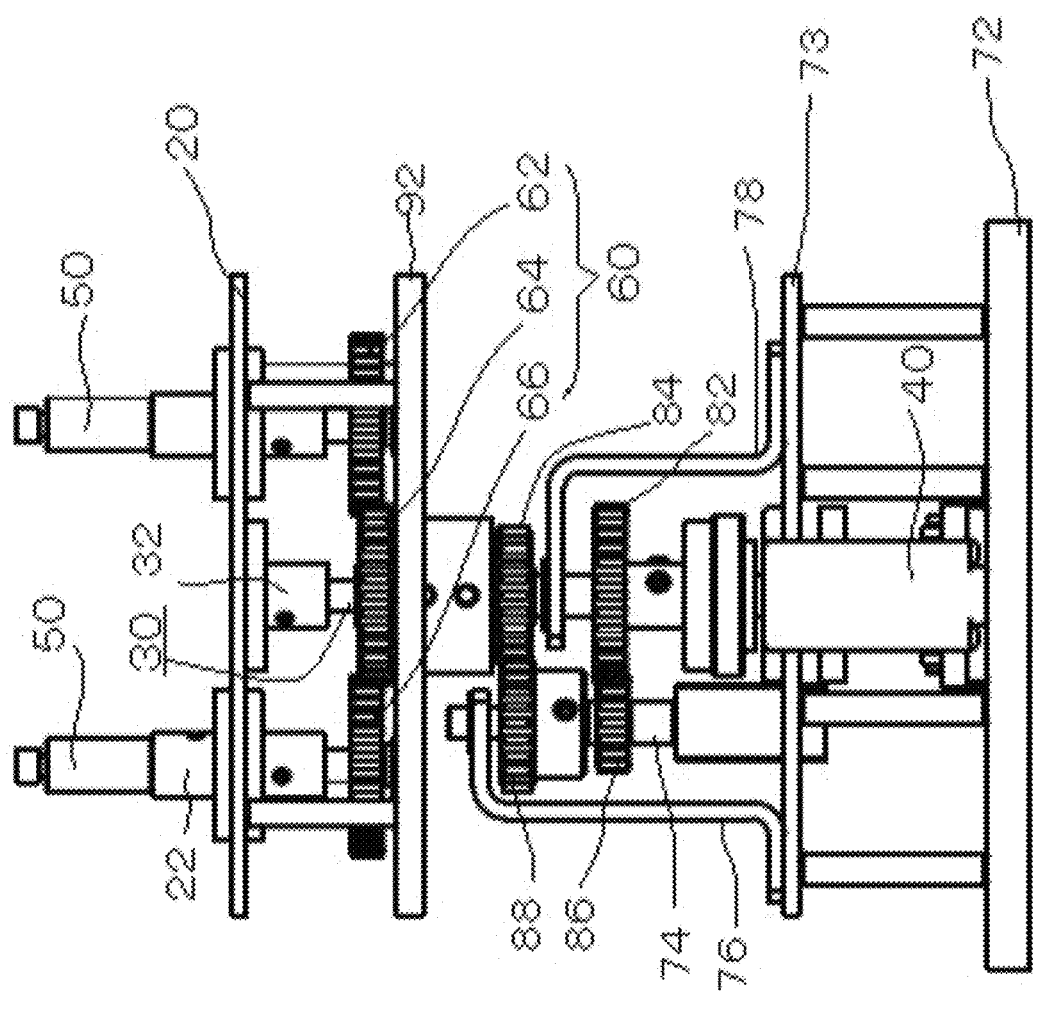
FIG. 2 is a side view of the image capturing device in FIG. 1 removed of image capturing units.

As shown in FIGS. 1 and 2, an image capturing device 1 according to the embodiment includes a plurality of image capturing units 10 each capable of forming an omnidirectional image.

The image capturing device 1 according to the embodiment further includes an image capturing unit mounting portion 20 on which the image capturing units 10 are mounted, a rotation driving shaft 30 which rotatably supports the image capturing unit mounting portion 20 so that the image capturing unit mounting portion 20 can be rotated, a driving unit (motor) 40 which supplies rotation force to the rotation driving shaft 30, and an image capturing unit shaft 50 disposed to the image capturing unit mounting portion 20 such that the image capturing unit shafts rotatably support each of the plurality of image capturing units 10 in a predetermined position. The device further includes driving force transmitting means 60 as a rotation adjusting mechanism which adjusts the respective rotations of the rotation driving shaft and the image capturing unit shafts so that the image capturing unit shafts 50 does not co-rotate with the rotation driving shaft 30, the image capturing unit 10 being kept facing a predetermined direction without following the rotation of the image capturing unit mounting portion 20 when the image capturing unit mounting portion 20 is rotated.

According to the embodiment, a driving unit 40 is placed and fixed on a base 72, and the driving shaft of the driving unit 40 is coupled to the rotation driving shaft 30 through four gears 82, 84, 86, and 88 instead of being directly coupled to the image capturing unit mounting portion 20. In this way, the rotation driving shaft can be shorter, so that the image capturing unit mounting portion can be rotated stably without shaft motion. The driving force transmitting shaft 74 provided with the gears 86 and 88 is provided with an S-shaped fixing jig 76. An S-shaped coupling jig 78 which fixes the driving shaft of the driving unit 40 and the rotation driving shaft 30 coaxially and in a non-interfering manner is provided at the coupling part between these shafts. The fixing jig 76 and the coupling jig 78 allow the shafts to be rotated stably, so that desired videos can be stably provided. These jigs are fixed at a jig mount 73 provided on the base 72.

(Image Capturing Unit)

According to the embodiment, the image capturing unit 10 is a so-called omnidirectional camera including a rectangular main body 14 and a lens 12 provided in an upper part of the main body 14 and capable of capturing a 360° panoramic image which covers all directions including right, left, up and down. Any of commercially available omnidirectional cameras may be used without restrictions if the camera can transfer captured image data by wire or wirelessly.

The two image capturing units 10 are placed at a predetermined distance apart from each other and placed to have their lenses face viewpoints set for each of the image capturing units. Here, the "viewpoint" refers to the direction of the lens of each of the image capturing units, and in the example shown in FIG. 1, the two image capturing units 10 face the same direction, and the direction of the lens is the "viewpoint."

(Image Capturing Unit Mounting Portion)

The image capturing unit mounting portion 20 has a disk shape and the rotation driving shaft 30 is fixed to the center of the lower surface thereof. The two image capturing unit shafts 50 are rotatably provided therethrough, and a jig 22 is provided at the part through which each of the image capturing unit shafts 50 extends.

(Rotation Driving Shaft)

The rotation driving shaft 30 is connected at the lower surface of the image capturing unit mounting portion 20 through a fixing member 32 having a disk-shaped fixing surface at its tip end and provided rotatably to extend downward through a carrying stage 92 for providing the driving force transmitting means 60. A gear 84 for transmitting driving force to the rotation driving shaft is provided at its lower tip end.

(Driving Unit)

The driving unit 40 is provided under the carrying stage, a gear 82 is provided at the upper tip end thereof, a lower gear 86 is engaged and coupled with the gear 82 of the driving unit 40 and an upper gear 88 is engaged and coupled with the gear 84 of the rotation driving shaft 30 so that driving force is transmitted to the gear 84 of the rotation driving shaft 30 by the driving force transmitting shaft 74 provided with the two gears 86 and 88.

(Image Capturing Unit Shaft)

The image capturing unit shafts 50 are fixed rotatably at the carrying stage 92 through an image capturing unit mounting portion 20 in opposed positions with respect to the central point of the image capturing unit mounting portion 20 to have the image capturing units 10 mounted thereon.

(Rotation Adjusting Mechanism)

According to the embodiment, the rotation adjusting mechanism is formed by the driving force transmitting means 60 which is disposed to each of the rotation driving shaft 30 and the image capturing unit shafts 50 so that the rotation driving force of the rotation driving shaft 30 is transmitted.

The driving force transmitting means 60 includes a center gear 64 provided at the rotation driving shaft 30 in the vicinity of the carrying stage and fulcrum gears 62 and 66 provided at each of the image capturing unit shafts 50 in the vicinity of the carrying stage and engaged with the center gear 64. The center gear 64 is provided at the lower part of the rotation driving shaft 30, and the fulcrum gears 62 and 66 are provided at the lower part of the respective image capturing unit shafts 50. The rotation driving force of the rotation driving shaft 30 is transmitted to the image capturing unit shafts 50 through the fulcrum gears.

(Functions and Effects)

In the image capturing device according to the embodiment, the driving shaft of the driving unit 40 is rotated to rotate the image capturing units 10, so that the rotation force is transmitted to the rotation driving shaft 30 through the gears 82, 84, 86, and 88. In this way, the rotation driving shaft 30 is rotated to rotate the image capturing unit mounting portion 20 in the direction of the arrow in FIG. 1.

At the time, the center gear 64 rotates as the rotation driving shaft 30 rotates, and the fulcrum gears 62 and 64 engaged with the center gear 64 rotate reversely from the center gear 64, so that the image capturing unit shafts 50 which support the image capturing units 10 rotate in the direction indicated by the arrow in FIG. 1. Therefore, the speed transmission rate among the gears may be adjusted as appropriate, so that the direction of the lenses of the image capturing units 10 can be constantly directed to face a set viewpoint, and the image capturing units 10 are always directed to face the same viewpoint by the setting according to the embodiment.

More specifically, the image capturing unit mounting portion 20 (a universal head) is provided so that while the two image capturing units (omnidirectional cameras) 10 arranged at a parallax distance are always directed to face the same direction, while only the positions of the image capturing units 10 move rotationally following the rotation of the image capturing unit mounting portion 20. In this manner, in a video display system which will be described, particularly in a system using a head mounted display (HMD), presentation of a rotated video in a remote place is not delayed from the rotation of the image capturing units 10, so that delay is only related to parallax information about the two image capturing units (cameras). Since delay between the rotation of the image capturing unit mounting portion 20 and the rotation of a video by the image capturing units 10 can be minimized, the effect of preventing VR sickness can be provided.

The driving unit for rotationally moving the positions of the two image capturing units 10 while keeping the image capturing units 10 facing one direction can be implemented using one motor. Therefore, videos from the two image capturing units (the omnidirectional cameras) may be projected on two spherical screens in a computer graphics (CG) space by live streaming, and the user can enjoy videos obtained from a virtual reality (VR) camera in the center of the spherical screens independently presented to the left eye display and right eye display in the HMD.

Therefore, using the image capturing device according to the embodiment, the following advantageous effects may be provided.

Reduction of VR sickness by resolving contradictory sensations and generation of physical sensations Achieving reduction of VR sickness as well as generation of motion sensations by presenting (passively/actively), in a unified manner, a real video including a motion component and stimulation of a vestibular sensation Reduction of VR sickness in a telescopic telepresence system Realization of a vicarious physical experience by VR Realization of a real time vicarious experience (traveling)

Using a number of conventional omnidirectional cameras radially arranged, a parallax can be obtained by the radial arrangement, but this does not mean that delay among the cameras is not included in an obtained video. In addition, obtained information which may include motion blur cannot be directly streamed depending on the camera resolution, and it takes some time for processing. The time shift caused as a result prevents real time performance, while this can be solved using the image capturing device according to the embodiment.

Furthermore, in reproducing a captured image or video footage, a shader code for developing equidistance projection may be used or a USB Video Class (UVC) Blender may be used. An image/video may be developed in regions and then subjected to stitching in real time, so that a smooth image/video image may be obtained.

An obtained video may be mapped to a sphere or output from the computer and used.

An obtained image/video may be reproduced using a device which enables binocular stereopsis using a head mounted display (HMD).

<Video Display System>

A video display system (hereinafter also referred to as the "system") according to the present invention as an example of use of the image capturing device according to the invention will be described.

Figure 3:
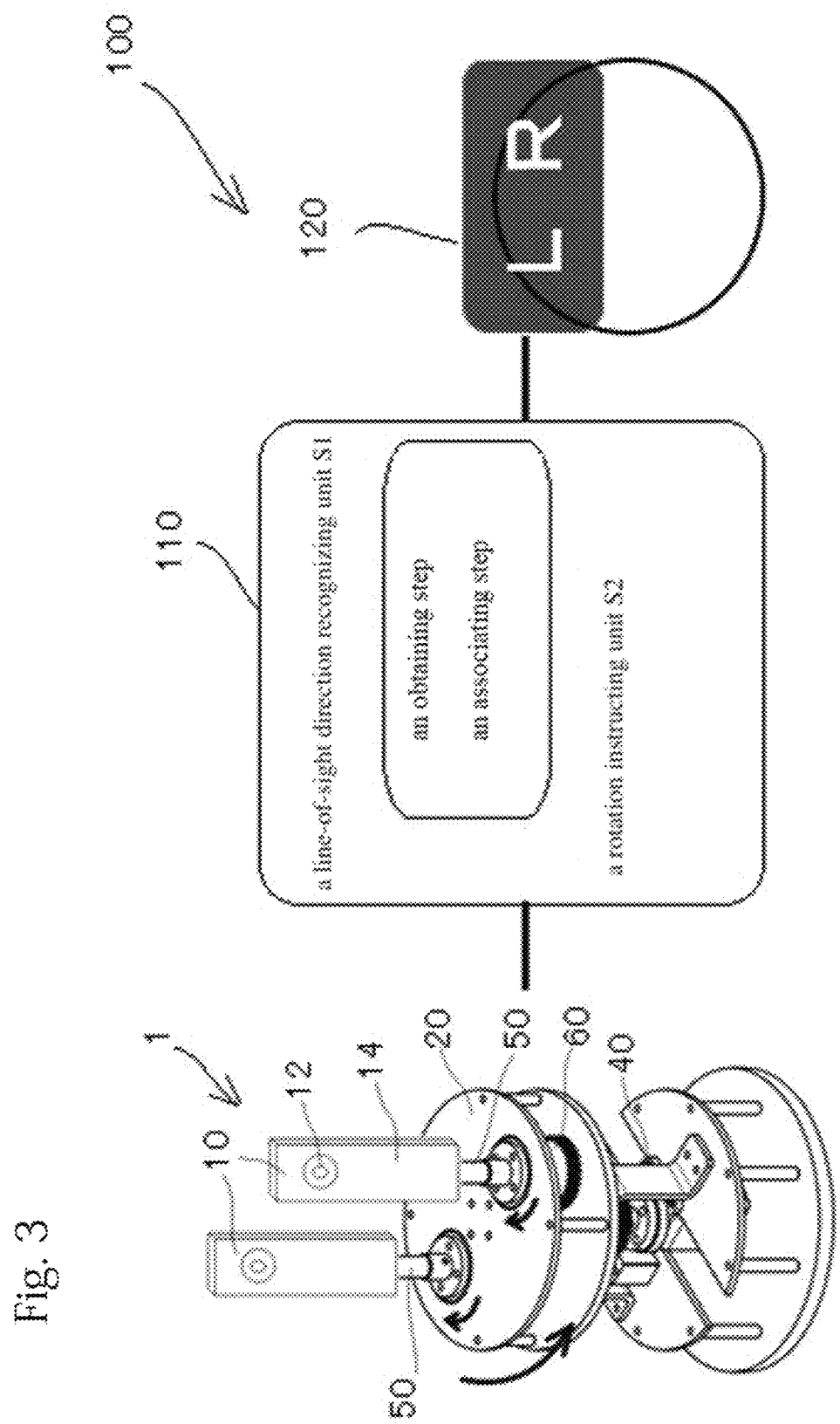
FIG. 3 is a schematic view of a video display system according to the present invention.

The video display system 100 according to the embodiment displays a video in response to an arbitrary video display request from an observer, and as shown in FIG. 3, the system includes the image capturing device 1 for obtaining a video and a computer 110 which includes a line-of-sight direction recognizing unit S1 which obtains a change in the line-of-sight direction of the observer, a rotation instructing unit S2 which instructs the image capturing device 1 to rotate in a prescribed direction in response to the change in the line-of-sight direction obtained from the line-of-sight recognizing unit S1, and an HMD 120 as a video display unit which displays a video obtained by the image capturing device. According to the embodiment, the cameras as the image capturing units 10 of the image capturing device 1 are connected to the computer 110 by wire (not shown) or wirelessly, and the computer 110 is connected to the HMD by wire or wirelessly. Here, wirelessly connecting means may be WIFI (registered trademark) or Bluetooth (registered trademark) without any particular restrictions.

Although not shown, a switching mechanism used to turn on/off driving force from the driving unit 40 is provided in order to carry out a rotation instruction from the rotation instructing unit. The switching mechanism may be any of known mechanisms without any particular restrictions.

(Computer)

Although not shown, the computer 110 in the system includes a central processing unit (CPU), a memory, and a recording medium (a hard disk or a solid state drive), and various applications are stored in the recording medium.

The applications stored in the computer 110 allow the computer 110 to operate as the line-of-sight direction recognizing unit S1 and the rotation instructing unit S2.

(Line-of-Sight Direction Recognizing Unit)

The computer activates the line-of-sight direction recognizing unit S1 when the computer implements an application which carries out the steps of obtaining information on the direction which a lens 12 faces in the image capturing unit 10 from the image capturing unit 10, recognizing the obtained direction of the image capturing unit, and associating the direction with the obtained image.

The obtaining step may be set on the basis of an image photographed by the image capturing unit 10 or the line-of-sight direction may be recognized on the basis of the direction of the image capturing unit 10 in an initial state.

In the associating step, the obtained image and the line-of-sight direction are associated with each other and with the rotation direction of the device rotated in response to an instruction by the rotation instructing unit which will be described, and it is instructed so that the rotation degree from the initial state of the image capturing device 1 and the line-of-sight direction of the image capturing unit are simultaneously associated with the image, and the video is displayed.

(Rotation Instructing Unit)

The computer activates the rotation instructing unit when the computer implements an application which carries out the step of instructing the driving unit 40 to rotate the image capturing unit mounting portion 20 in the image capturing device 1 in response to an instruction from the user.

The instruction from the user is input to the computer 110 through an input device provided in the computer 110 such as a mouse device, a keyboard, and a controller. According to the embodiment, the HMD provided with an acceleration sensor and a three-dimensional sensor is used, and therefore the HMD as a video display unit which displays a video is used as an input device.

(Functions and Effects)

The video display system according to the embodiment may have a personalized design, and image capturing can be carried out while keeping the line-of-sight direction of (the observer), and a video can be displayed directly with no delay.

More specifically, as the user uses the HMD and turns the head in an arbitrary direction while viewing a displayed video, the image capturing unit mounting portion of the image capturing device rotates in the direction the user faces (preferably at the same speed for the same horizontal angle). Since the image capturing units are omnidirectional cameras, image capturing for 360° in all directions is enabled, so that according to the embodiment, changes in the direction of the user in the vertical direction is corrected by processing the obtained image using known means. In this way, the viewpoint of the image capturing device rotates in the same manner as the motion of the user, so that the user can have simulated experience of seeing a view in a location where the image capturing device is present.

In this way, the device may be used in various modes including a case in which an observer A uses an image capturing device, and another person B has a simulated experience of viewing what the observer A looks at, and a case in which an image capturing device is placed in a location that is different from the location where the observer A is present so that the observer A can have a simulated experience of looking at a view in the location where the observer A is not present.

The image capturing device and the video display system according to the present invention have been described, but the described embodiment is not intended to limit the present invention, and various modifications are available without departing from the gist and scope of the present invention.

A separate driving unit for applying different driving force from that of the driving unit may be provided at the image capturing unit shaft, so that the image capturing unit may be rotated independently.

The image capturing unit mounting portion may be rotated not only in the horizontal direction but also in the vertical direction. A sensor may be attached to an observer instead of the HMD and a monitor may display the result.

EXAMPLES

Now, the present invention will be described more in detail by referring to inventive examples and comparative examples, while the following description is not intended to limit the present invention.

First Inventive Example

Figure 4A:
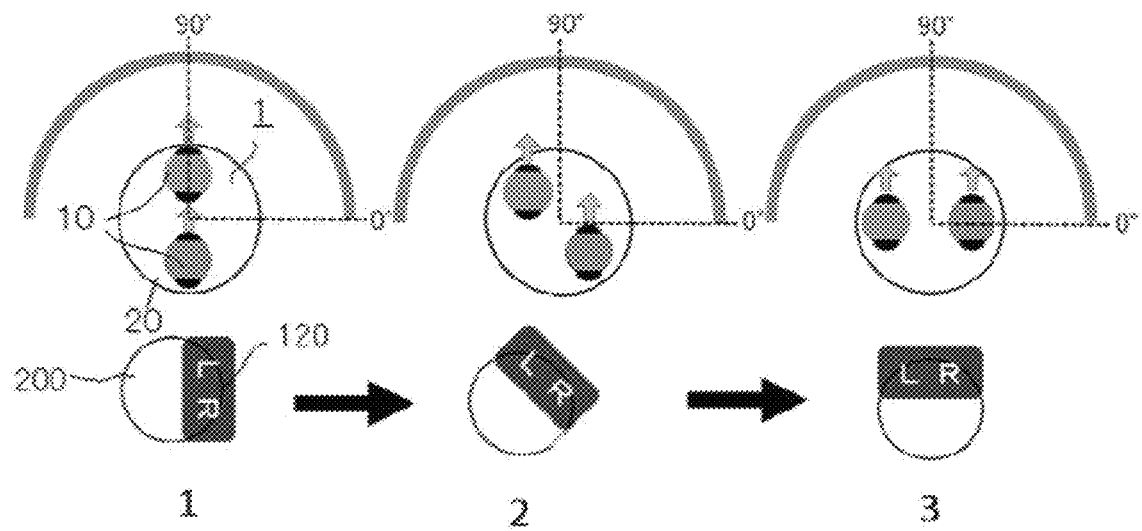
FIGS. 4(*a*)-4(*c*) illustrate advantageous effects of the image capturing device according to the present invention, specifically, FIG. 4(*a*) is a schematic view for illustrating a general idea of a test carried out using an image capturing device according to the present invention, FIG. 4(*b*) is a schematic view for illustrating a general idea of a test carried out using an image capturing device according to a comparative example.
FIG. 4(c) is a chart for illustrating a result of contrast measurement.
Figure 4B:
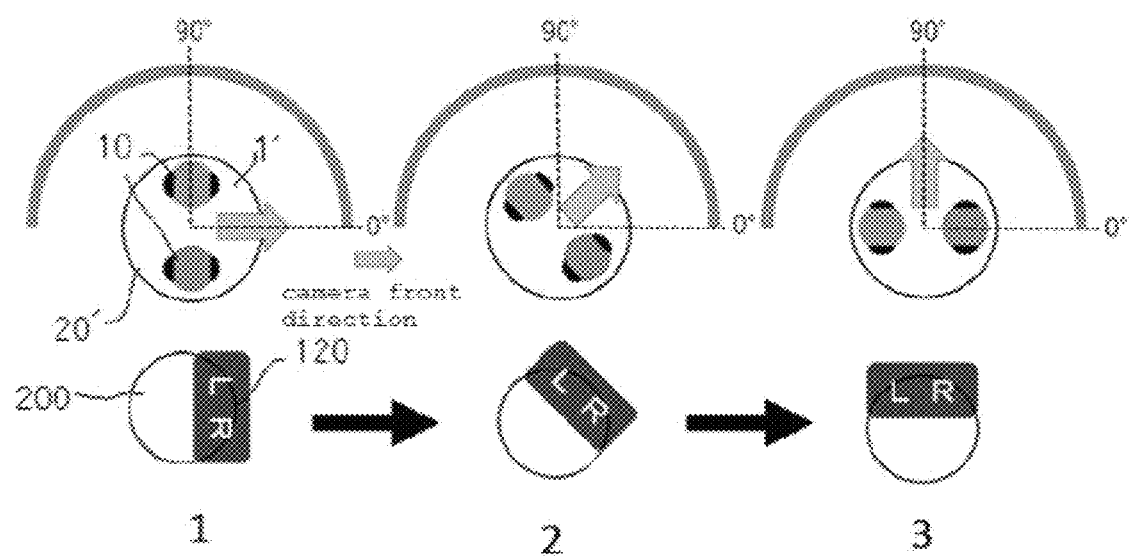
Figure 4C:
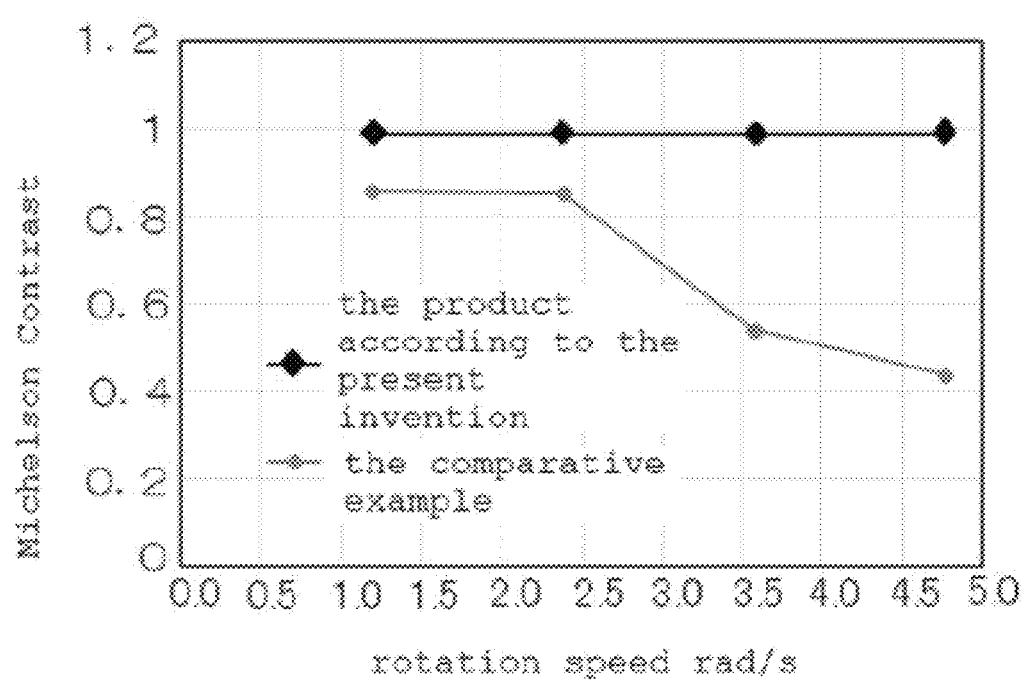

As shown in FIG. 4, using a video display system (with no computer shown) using the image capturing device 1 according to the embodiment, image blur was attributable to operation of the image capturing device was examined. As shown in FIG. 4(*a*), the head 200 of the user wearing the HMD 120 was turned and set at the positions of 1 (in the 0° direction in which the user faces the direction of the camera lens or the camera front direction), 2 (in the 45° direction or the direction in which the head is turned 45° leftward from the direction of the camera lens or the camera front direction), and 3 (in the 90° direction or the direction in which the head is turned 90° leftward from the direction of the camera lens or the camera front direction), and image blur was measured in each of the states. The image blur was examined by capturing a white and black stripe image placed 1 m apart from the image capturing device and obtaining a contrast as a result using Michelson contrast formula.

As shown in FIG. 4(*b*), instead of the image capturing device according to the present invention, using a known image capturing device which simply has a camera 10 placed on a normal table 20' as a comparative example, the same experiment was conducted and a contrast was checked.

The results are given in FIG. 4(*c*). As can be clearly seen from the results shown in FIG. 4(*c*), there was no reduction in contrast caused by the rotation of the image capturing device 1, and the stripe image was recognized without blur or fuzziness. This was also recognized visually, and the stripes were clearly recognized in the result obtained using the image capturing device according to the present invention while the stripes were blurred in the result obtained using the conventional device.

Then, two samples were arranged 30 cm apart from each other, one of the samples was placed 1 m apart from the image capturing device according to the present invention, while the other was placed 120 cm apart from the image capturing device, and two images of the samples were captured. Then, how much blur was caused by the difference between the depths of the two images was examined, and the result is given in FIG. 5. As a comparative example, blur caused by image capturing using one camera was measured. The result is given in FIG. 5.

Figure 5:
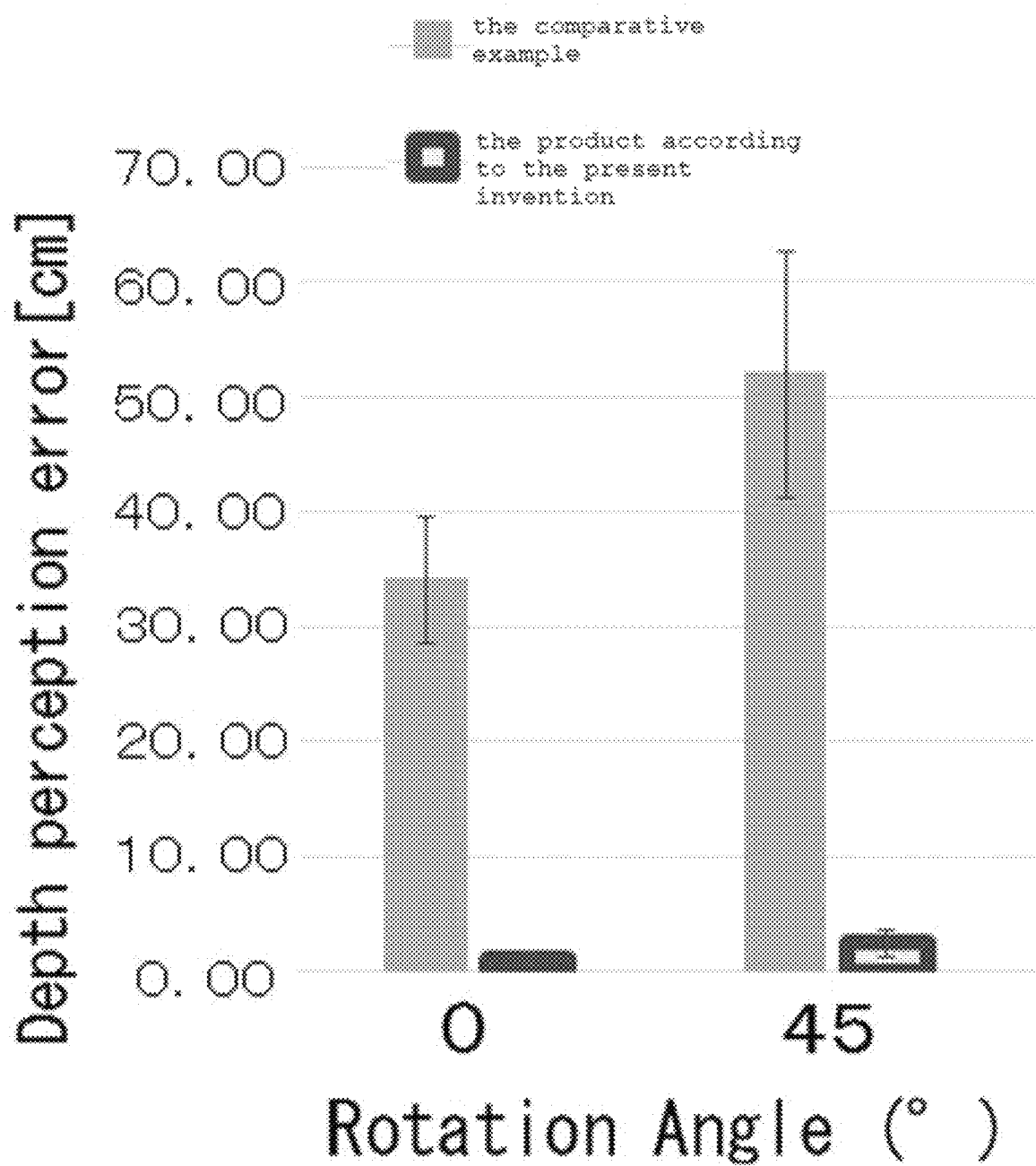
FIG. 5 is a chart for illustrating a result of measuring a depth perception accuracy using the image capturing device according to the present invention.

As can be clearly seen from the result in FIG. 5, substantially no error was generated in depth perception using the image capturing device according to the present invention.

Figure 6:
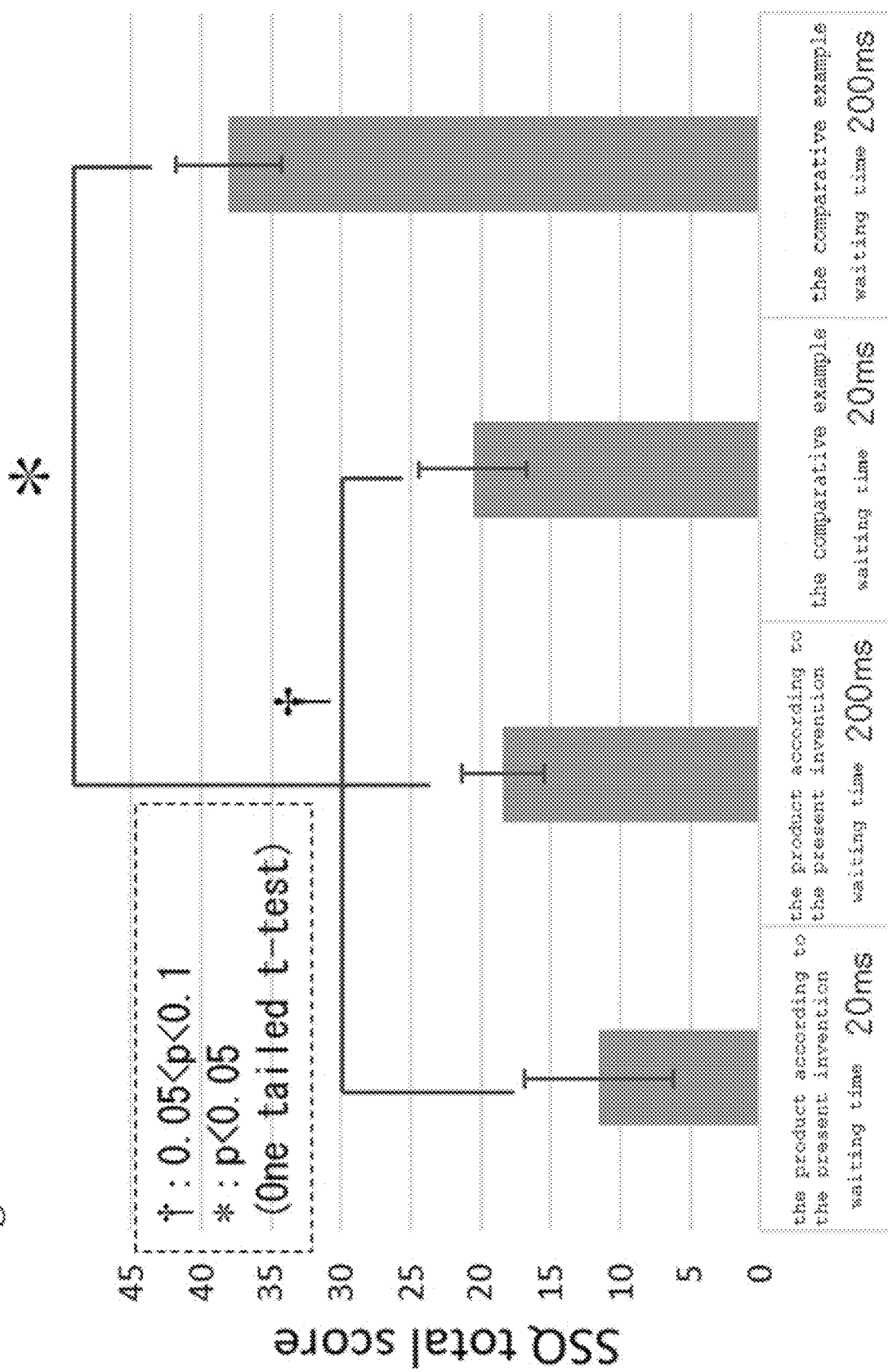
FIG. 6 is a chart for illustrating a measurement result about the degree of VR sickness observed using the image capturing device according to the present invention.

Furthermore, as shown in FIG. 4, using the image capturing device according to the present invention and the image capturing device in the comparative example for 60 seconds, the degree of VR sickness caused as the HMD was moved in the left-right direction was evaluated according to SSQ (Simulator Sickness Questionnaire). During the left-right movement, the user was instructed to move the head to randomly look at targets placed in seven locations (within 270°) in a training area (30 times at intervals of 2 seconds while changing the waiting time as shown in FIG. 6 and randomly changing the direction to look). The result is given in FIG. 6.

As can be clearly seen from the result shown in FIG. 6, the product according to the present invention is unlikely to cause VR sickness.

The invention claimed is:

1. An image capturing device comprising a plurality of image capturing units each capable of forming an omnidirectional image, the image capturing device comprising:
   an image capturing unit mounting portion on which the image capturing units are mounted;
   a rotation driving shaft which rotatably supports the image capturing unit mounting portion;
   a driving unit which supplies rotating force to the rotation driving shaft; and
   image capturing unit shafts disposed to the image capturing unit mounting portion such that the image capturing unit shafts rotatably support each of the image capturing units in a predetermined position,
   the image capturing device further comprising a rotation adjusting mechanism which adjusts the respective rotations of the rotation driving shaft and the image capturing unit shafts so that the image capturing unit shafts does not co-rotate with the rotation driving shaft, each of the image capturing units being kept facing a predetermined direction without following the rotation of the image capturing unit mounting portion when the image capturing unit mounting portion is rotated.

2. The image capturing device of claim 1, wherein the rotation adjusting mechanism is a driving force transmitting means disposed on the rotation driving shaft and the image capturing unit shafts so that rotation driving force from the driving unit is transmitted to each of the image capturing unit shafts through the rotation driving shaft.

3. The image capturing device of claim 2, wherein the image capturing device comprises two image capturing units, the two image capturing units are placed at a predetermined distance apart from each other and placed to face viewpoints set for each of the image capturing units, and
   the driving force transmitting means comprises a center gear disposed on the rotation driving shaft and fulcrum gears disposed on the image capturing unit shafts and configured to engage with the center gear.

4. A video display system which displays a video in response to any observer's request to display a video, the system comprising:
   the image capturing device of claim 1 for obtaining a video;
   a line-of-sight direction recognizing unit which obtains a change in a line-of-sight direction of the observer;
   a rotation instructing unit which instructs the image capturing device to rotate in a given direction in response to the change in the line-of-sight direction obtained by the line-of-sight direction recognizing unit; and
   a video display unit which displays the video obtained by the image capturing device.

\* \* \* \* \*